(No Model.)
J. F. ROSS.
Process for Making Inner Soles for Boots and Shoes.
No. 229,556. Patented July 6, 1880.
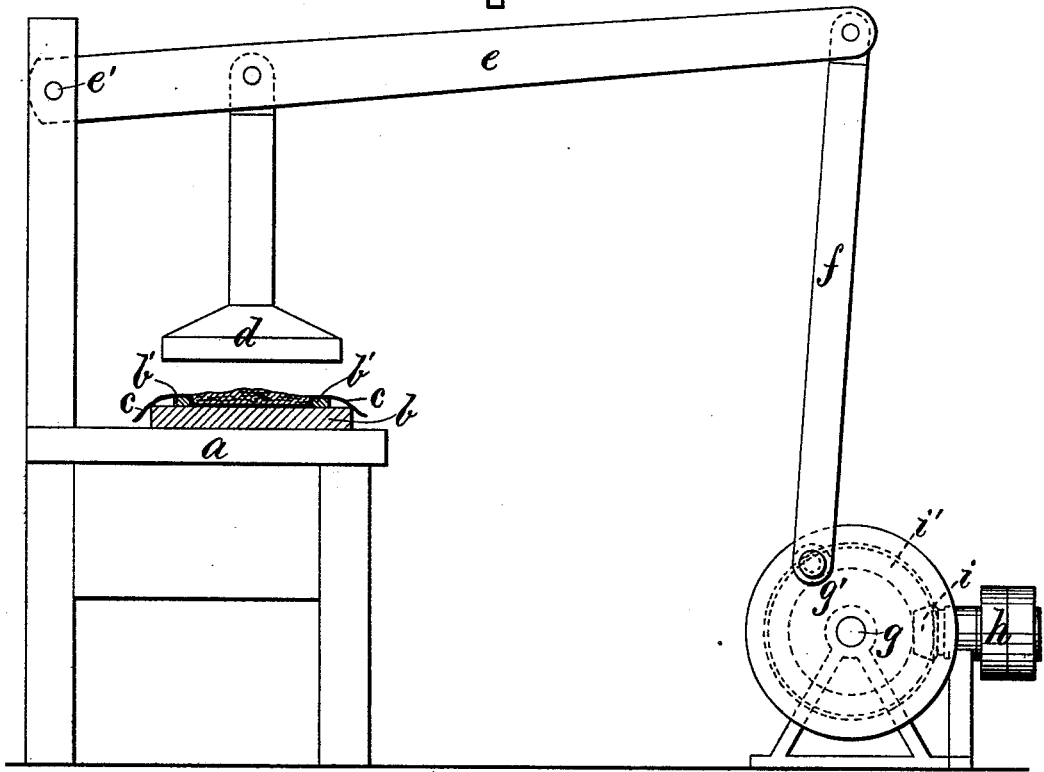
Witnesses:
Henry Chadbourn,
F. Allen,
Inventor:
Joseph F. Ross.
by Alban Andren,
his atty.

UNITED STATES PATENT OFFICE.

JOSEPH F. ROSS, OF IPSWICH, MASSACHUSETTS.

PROCESS FOR MAKING INNER SOLES FOR BOOTS AND SHOES.

SPECIFICATION forming part of Letters Patent No. 229,556, dated July 6, 1880.

Application filed March 22, 1880. (No model.)

*To all whom it may concern:*

Be it known that I, JOSEPH F. ROSS, a citizen of the United States, residing at Ipswich, in the county of Essex and State of Massachusetts, have invented certain new and useful Improvements in Processes for Making Inner Soles for Boots and Shoes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to an improved process for making pasted inner soles for boots and shoes; and it consists in laying the leather-pulp usually employed for this purpose, wrapped in a leather cover composed of a thin leather split or scrap of proper size, into a mold having raised edges and subjecting the whole contents of such mold at one operation to pressure in a press, and subsequently folding the cover on the top of the leather-pulp and again compressing its whole surface, as at first, either in the same press or in a secondary press for this purpose.

After the contents of each mold have been treated as above set forth they are removed and dried on racks in a suitable drying-room in the usual manner.

By this process I am able to make pasted inner soles much more rapidly than heretofore has been done, and also to produce a more homogeneous product that is very strong and tenacious, and without any liability to break or crack, as is common with hand-laid inner soles.

Figure 1 represents a side elevation, and Fig. 2 represents a plan view, of an apparatus used for carrying out my improved process.

On said drawings, $a$ represents a suitable work-table, upon which is placed a mold, $b$, having raised edges $b'$ $b'$ on its four sides, as shown. Into this mold is placed a thin leather split or scrap, $c$, large enough to cover the bottom of the mold and to project beyond its edges, as shown. Into this cover $c$ is placed a suitable amount of leather-pulp composed of leather scraps and paste mixed together, and the whole contents of the mold are at one operation compressed by the head $d$ of a suitable press, the one in the drawings being shown as composed of the lever $e$, hung at $e'$, and having in its outer end a jointed connecting-rod, $f$, the lower end of which is connected to the crank $g'$ on the rotary shaft $g$, as shown, the latter being driven by means of the belt-pulley $h$ and intermediate gearings $i$ $i'$, as shown; but I desire here to state that I do not confine myself to the use of any peculiar construction of the press used in carrying out my process, as any of the usual presses may be used for this purpose.

After the contents of the mold have been compressed, as described, the overlapping portions of the cover are folded on the top of the pulp, and the whole is again subjected to pressure by the vertically-adjustable head $d$, after which the contents of the mold are removed and transferred to a suitable drying-room.

Having thus fully described the nature and operation of my invention, I wish to secure by Letters Patent and claim—

The herein-described process for making pasted inner soles, consisting in first laying the leather-pulp on a wrapper placed in the mold and subjecting its whole surface at one operation to pressure within a press, and afterward folding the overlapping portions of the wrapper on the top of the leather-pulp, and finally subjecting its whole surface to pressure, in a manner and for the purpose set forth.

In testimony whereof I have affixed my signature in presence of two witnesses.

JOSEPH F. ROSS.

Witnesses:
CHARLES A. SAYWARD,
ALBERT P. JORDAN.